(12) United States Patent
Chi-Sheng et al.

(10) Patent No.: US 7,463,391 B2
(45) Date of Patent: Dec. 9, 2008

(54) IMAGE SENSOR WITH DEVICE FOR ADJUSTING FOCUS

(75) Inventors: Lin Chi-Sheng, Taipei County (TW); Wang Yu-Ling, Taipei County (TW)

(73) Assignee: Asia Image Tech Inc., Taipei (TW)

( * ) Notice: Subject to any disclaimer, the term of this patent is extended or adjusted under 35 U.S.C. 154(b) by 642 days.

(21) Appl. No.: 11/061,811

(22) Filed: Feb. 22, 2005

(65) Prior Publication Data

US 2006/0028700 A1 Feb. 9, 2006

(30) Foreign Application Priority Data

Aug. 5, 2004 (TW) .............................. 93123452 A

(51) Int. Cl.
*H04N 1/04* (2006.01)

(52) U.S. Cl. .................. 358/474; 358/471; 358/474; 358/509

(58) Field of Classification Search .................. 358/474, 358/406, 483, 471, 509; 359/196; 382/321; 403/374.1

See application file for complete search history.

(56) References Cited

U.S. PATENT DOCUMENTS

| | | | |
|---|---|---|---|
| 6,243,185 B1 * | 6/2001 | Lin et al. | 359/196 |
| 6,553,155 B1 * | 4/2003 | Imamura et al. | 382/321 |
| 6,585,446 B2 * | 7/2003 | Kaneko | 403/374.1 |
| 6,894,813 B2 * | 5/2005 | Spencer et al. | 358/483 |
| 7,088,476 B2 * | 8/2006 | Yokota et al. | 358/474 |
| 7,253,930 B2 * | 8/2007 | Hendrix et al. | 358/474 |
| 2003/0025947 A1 * | 2/2003 | Spears et al. | 358/474 |
| 2003/0053148 A1 * | 3/2003 | Matsumoto | 358/474 |
| 2004/0036928 A1 * | 2/2004 | Huang | 358/474 |
| 2004/0057082 A1 * | 3/2004 | Liu | 358/406 |
| 2004/0061908 A1 * | 4/2004 | Cheng | 358/474 |
| 2005/0036176 A1 * | 2/2005 | Harris | 358/474 |
| 2006/0012836 A1 * | 1/2006 | Boemler | 358/474 |

FOREIGN PATENT DOCUMENTS

| | | |
|---|---|---|
| CN | 2634752 | 8/2004 |
| EP | 444952 A2 * | 9/1991 |
| EP | 533108 A1 * | 3/1993 |
| JP | 1184543 | 7/1989 |

OTHER PUBLICATIONS

E.E. Anderson and Weng-Lyang Wang, A novel contact image sensor (CIS) module for compact and lightweight full page scanner applications, 1993, SPIE, vol. 1901 Cameras, Scanners and Image Acquisition Systems, pp. 173-181.*

Roland Simonis, Scanner analyzer target, 1991, SPIE, vol. 1454 Beam Deflection and Scanning Technologies, pp. 364-369.*

* cited by examiner

*Primary Examiner*—Mark Zimmerman
*Assistant Examiner*—Miya J Cato

(57) ABSTRACT

A focus adjusting device (50) for an image sensor (1) is provided for ensuring precise focusing of the image sensor. The focus adjusting device includes a contact element (51) in direct contact with the bottom of a scanner cover plate, a focus varying element (53) engaging with the contact element, and a focus fine adjusting element (55) movably mounted on a housing of the image sensor. The focus varying element and the contact element are driven to correspondingly move vertically together with the vertical movement of the focus fine adjusting element, whereby the distance between an upper surface of the housing and the bottom of the cover plate is thus changed for precise focusing.

15 Claims, 5 Drawing Sheets

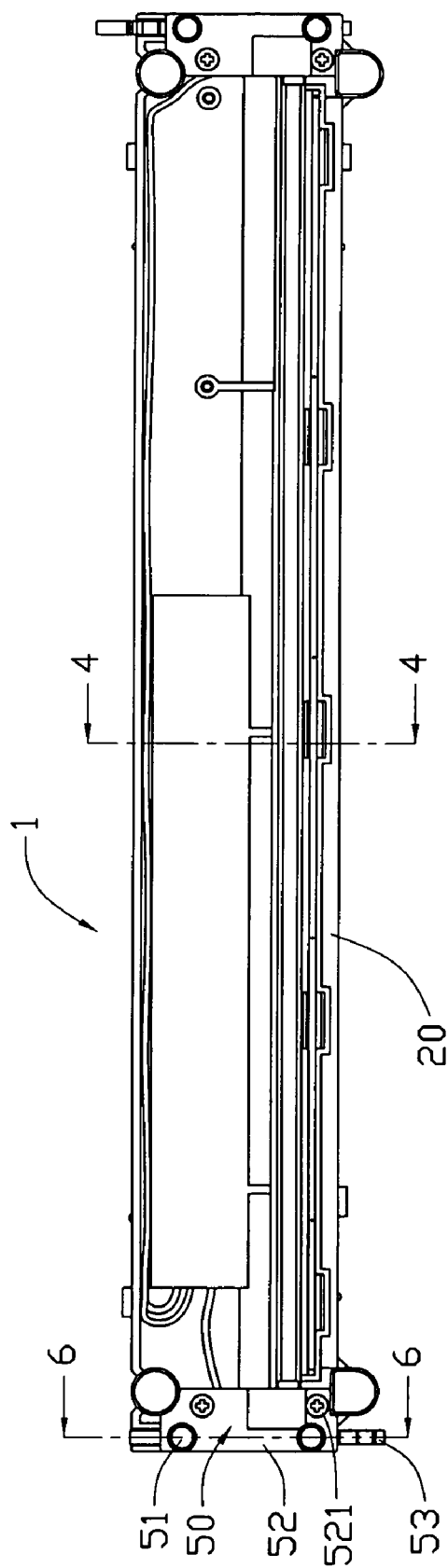
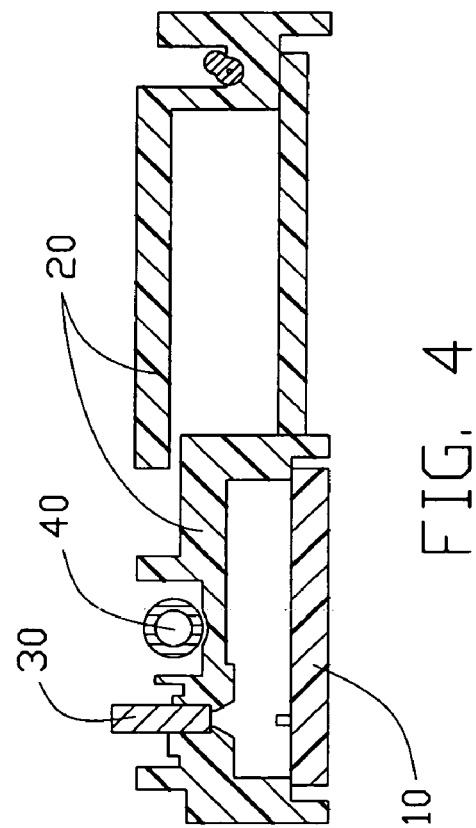
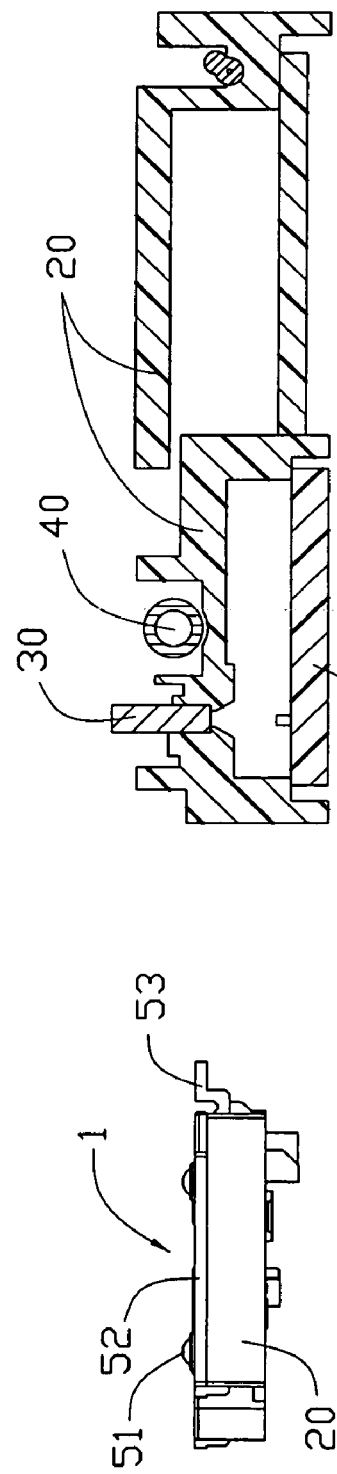
FIG. 2
FIG. 3
FIG. 4

IMAGE SENSOR WITH DEVICE FOR ADJUSTING FOCUS

BACKGROUND OF THE INVENTION

1. Field of the Invention

The present invention relates to an image sensor for reading an image document or the like, and particularly relates to an image sensor with a focus adjusting device.

2. Description of Prior Art

Image sensors are used to read an image document and convert the image document into an electric signal in image scanners, facsimile machines, or the like. The image sensors that are available at present are roughly classified into two types, i.e., an optical image sensor having a size-reduction optical system including lenses for focusing an image document at a reduced scale onto a CCD (charge-coupled device) to read the image document, and a contact image sensor (CIS) having a sensor unit composed of a plurality of sensor elements formed according to a thin-film fabrication process on an insulating substrate which has a width greater than the width of an image document to be read, the sensor unit being held in direct contact with the image document without any size-reduction optical system interposed therebetween. The CIS module is movably guided by two long, spherical railways at both ends thereof. The two long, spherical railways coupled to the CIS module act like a railroad to a train.

A typical configuration of a prior art CIS module 100 is illustrated in FIG. 1. The CIS module 100 is used to integrate all of the components to a compact and light weight module. The CIS module 100 consists of: (1) an LED light source 104 to illuminate the document being scanned, (2) a one-to-one Selfoc Lens Array (SLA) or rod lens array 103 to focus the document image to the image sensor array 106; (3) a hybrid sensing substrate 101 which comprises a plurality of image sensor arrays 106 and its associated circuitry is used to convert an optical signal to an electronic signal; (4) a cover plate 9 where the document to be scanned rests; (5) a connector (not shown) to connect the electronic signal of the module to outside circuitry; and (6) a protective housing 102 to house all of the above components. The LED light source 104 provides red, green and blue light, which combine to provide white light, and directs the light at the document being scanned. The light that is reflected from the document is then gathered by the SLA 103 and directed at the image sensor arrays 106 on the sensing substrate 101 that rests just under the document being scanned. The sensor arrays 106 then record the images by transforming intensities of light that hits the sensor arrays 106 into digital data. The digital data are finally read out by a computer program through the connector to reproduce the document image.

With the development of scanning technologies and increased requirement for high resolution scanning performance, the scanning resolution has been raised from earlier 300 dpi (dots per inch), 600 dpi to 1200 dpi or higher. However, along with the requirement for high optical resolution, focusing has become an important concern during scanning process. In addition, the objects capable of being scanned have become diversified and can be roughly classified into two types, i.e., non-transparent objects and transparent objects. The transparent objects, such as film-based 35 mm slides or negatives, necessitate complicated scanner configurations and high optical resolution requirements. In general, the higher the resolution, the more detail a scanner can capture, which is especially important when enlarging small objects, such as 35 mm slides. High resolution requires low focus tolerance of the optical system. Conventionally, the main measure taken to decrease the overall focus tolerance of the optical system is to strictly control the dimension precision of scanner components during manufacturing. This results in reduced yield rate and increased production cost, and also focus adjusting cannot be implemented. Alternatively, pads of various thickness are used to ensure precise focusing. However, this requires manufacture of a plurality of pads of different thickness that are selected to compensate for the gross tolerance of an end product, so that consistent focus can be obtained for different end products. It is clear that this method complicates the configuration of the end product and the focus adjusting method, and thus has a negative effect on production efficiency and cost.

Hence, an image sensor with an improved focus adjusting device is desired to meet the requirement for high resolution.

SUMMARY OF THE INVENTION

Accordingly, one object of the present invention is to provide an image sensor having a focus adjusting device to ensure precise focusing.

Another object of the present invention is to provide a focus adjusting device for an image sensor that compensates for the gross tolerance of the image sensor and thus ensures high quality scanning performance for various kinds of objects being scanned.

To achieve the above objects of the present invention, an image sensor in accordance with the present invention comprises a sensing substrate with image sensing elements disposed thereon, a light source for illuminating the object being scanned, a lens for gathering the light reflected from the object being scanned and focusing the reflected light on the image sensing elements of the sensing substrate, a housing for housing the above components, and two focus adjusting devices provided at respective opposite ends of the housing. The focus adjusting devices are adapted to adjust the focus of the optical system of the image sensor so that precise focusing can be ensured. Each focus adjusting device includes a contact element in direct contact with the bottom of a scanner cover plate and a focus fine adjusting element movably mounted on the housing. The contact element is moved along with the movement of the focus fine adjusting element, whereby the distance between an upper surface of the housing and the bottom of the cover plate is thus changed to implement focus adjustment.

Each focus adjusting device may further include a focus varying element having upper surfaces at different levels, and a supporting element mounted on the housing for supporting the focus varying element.

The components of the focus adjusting device can be classified into two types. One is passive components moving upwards and downwards when driven by other components for changing the distance between the upper surface of the housing and the bottom of the cover plate. The other is active components capable of moving itself and contacting with the passive components for driving and controlling the movement of the passive components to get precise focusing. The passive components include the contact element and the supporting element, and the active components include the focus fine adjusting element and the focus varying element.

The provision of a focus adjusting device on the present image sensor ensures precise focusing and thus high quality scanning performance by movement activities between the active and passive components of the focus adjusting device.

BRIEF DESCRIPTION OF THE DRAWINGS

The present invention may best be understood through the following description with reference to the accompanying drawings, in which:

FIG. 2 is a top plan view of an image sensor in accordance with the present invention;

FIG. 3 is a side view of the present image sensor;

FIG. 4 is a cross-sectional view taken along line 4-4 of FIG. 2;

DETAILED DESCRIPTION OF THE INVENTION

Figure 1:
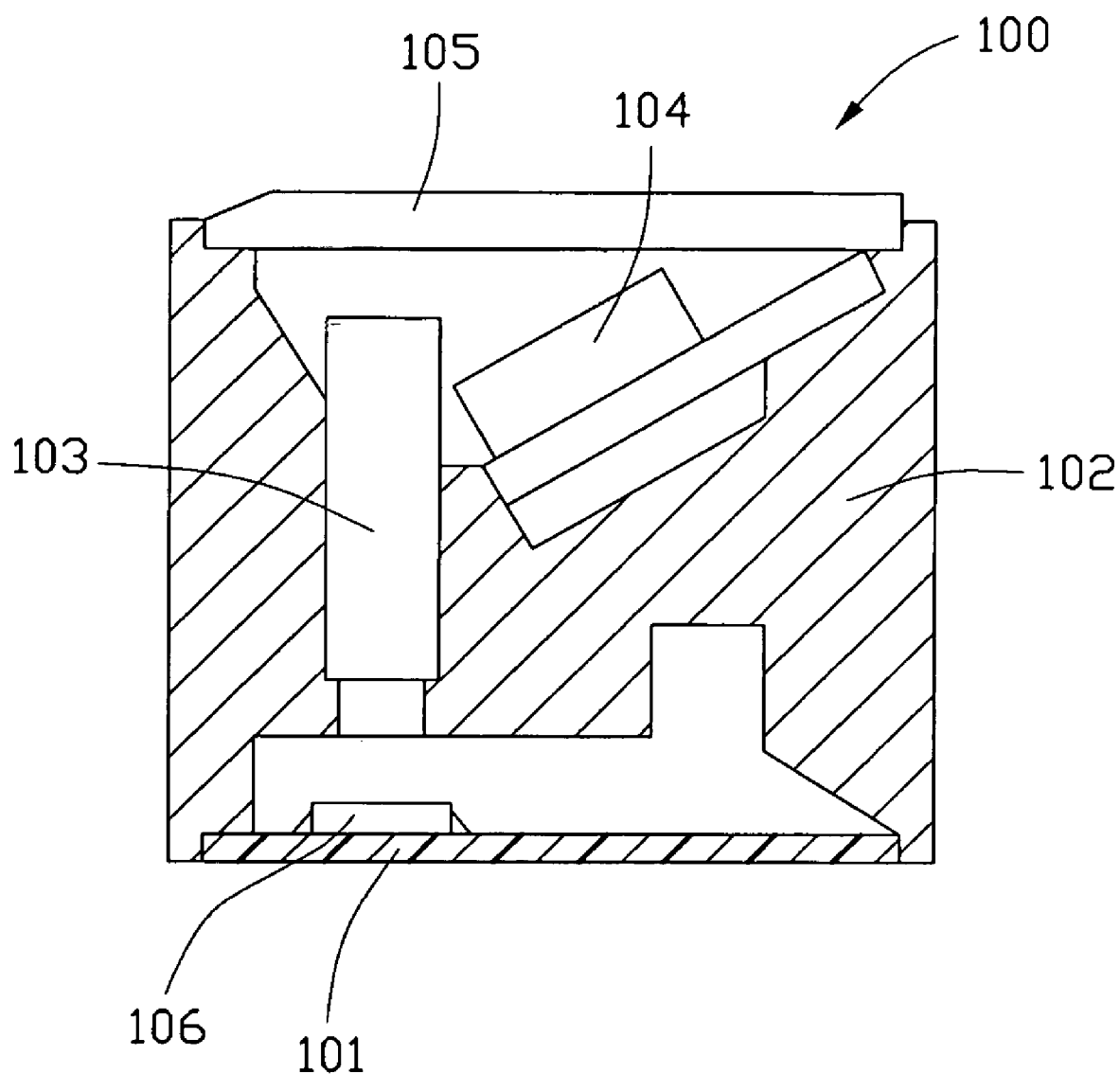
FIG. 1 is a cross-sectional view of a conventional image sensor.

Referring to FIGS. 2-4, an image sensor 1 in accordance with the present invention includes a sensing substrate 10, a lens 30, a light source 40, and a housing 20 for housing the above components therein. The sensing substrate 10 has image sensing elements such as CCDs, electrical components and associated circuitry disposed thereon. The light source 40 is adapted to illuminate the object to be scanned, such as a document. The lens 30 is a one-to-one Selfoc Lens Array (SLA) or rod lens array 103. The lens 30 gathers the light reflected from the object to be scanned and focuses the reflected light on the image sensing elements on the sensing substrate 10.

Figure 5:
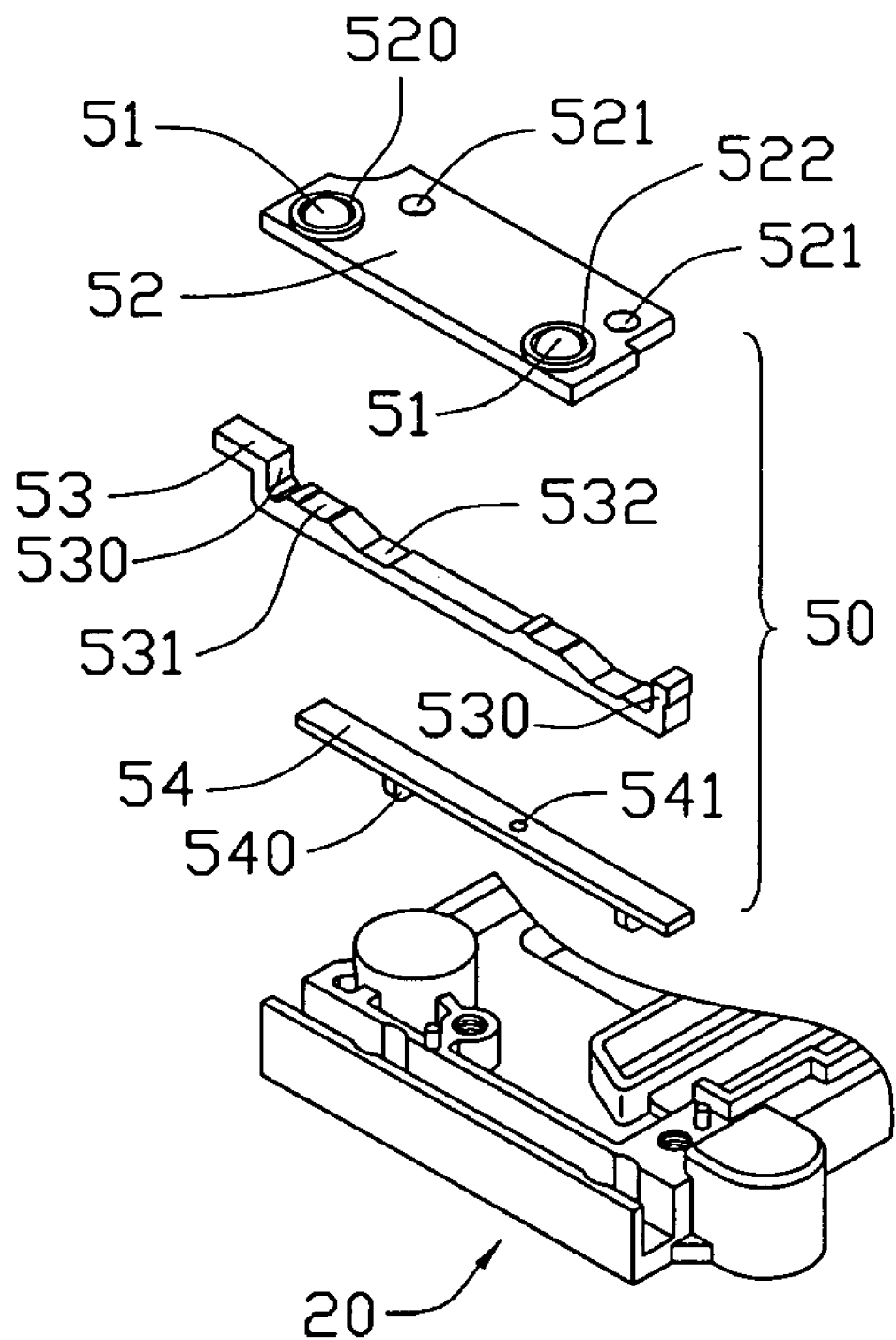
FIG. 5 is an exploded, perspective view of a focus adjusting device in accordance with a first embodiment of the present invention, and an end portion of the housing of the present image sensor.
Figure 6:
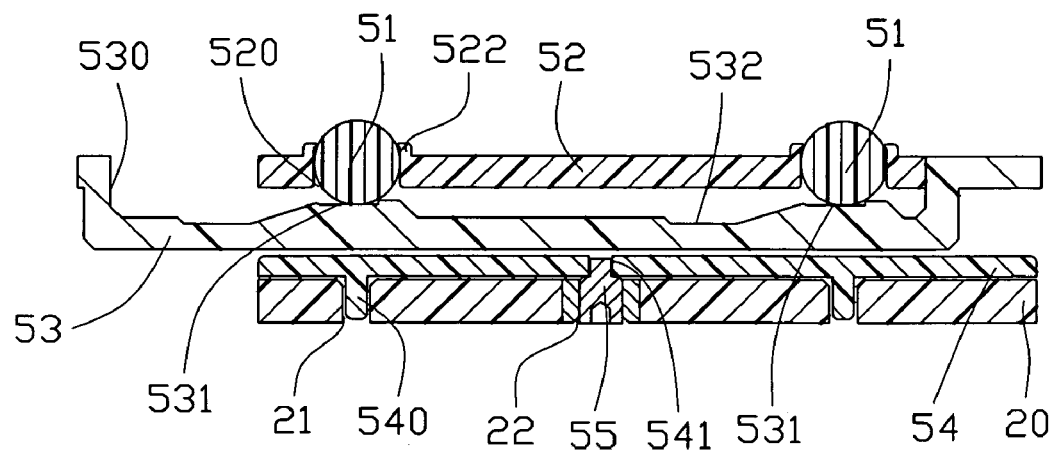
FIG. 6 is a cross-sectional view taken along line 6-6 of FIG. 2, illustrating that a focus varying element of the present image sensor shown in FIG. 5 is at a first position.
Figure 7:
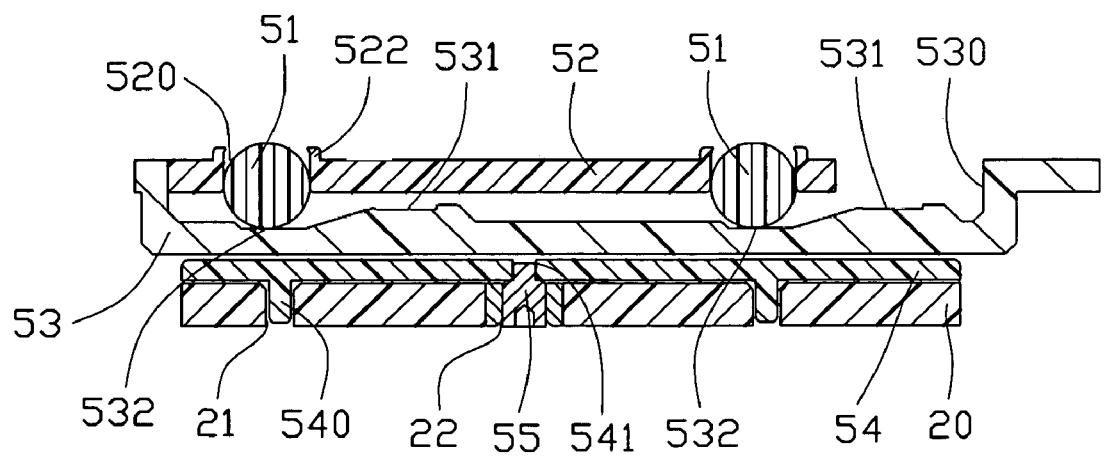
FIG. 7 is a cross-sectional view illustrating a second position of the focus varying element of the present image sensor.

Also referring to FIGS. 5-7, it is shown that a focus adjusting device 50 in accordance with a first embodiment of the present invention is provided at each end of the housing 20 for adjusting the distance between an upper surface of the housing 20 and the bottom of a scanner cover plate (not shown) or the object to be scanned. The focus adjusting device 50 includes a contact element 51, a focus varying mechanism and a focus fine adjusting mechanism. The focus varying mechanism is used to change the focus of the image sensor 1 corresponding to the kind of the object to be scanned. However, no matter what kind of object is to be scanned, precise focusing is the key for good image. This is particularly true when a focus varying mechanism is used. The inevitable accumulated tolerance of the components may cause the problem of out of focus, which must be corrected by a focus fine adjusting mechanism while bringing no increase in production cost and manufacturing precision of the components. The contact element 51 is adapted to directly contact with the bottom of the cover plate, and is retained in a retaining element 52. The focus varying mechanism includes a focus varying element 53 engagable with the contact element 51, whereby the contact element 51 is driven to move to a large extent. The movable focus fine adjusting mechanism engages with the focus varying element 53, whereby the contact element 51 can be correspondingly driven to move to a small extent. The focus fine adjusting mechanism includes a strip-shaped supporting element 54 for supporting the focus varying element 53, and a focus fine adjusting element 55 beneath the supporting element 54.

The focus varying element 53 is elongated and is horizontally movable to guide the contact element 51 to move upwards and downwards to a large extent. The lower surface of the focus varying element 53 is in contact with the upper surface of the supporting element 54 of the focus fine adjusting mechanism. The focus varying element 53 has at least two upper planar surfaces at different levels in height, along which the contact element 51 correspondingly moves upwards and downwards to vary focus, so that objects of different kinds can be scanned by the same image sensor 1. A side bar 530 is provided at each end of the focus varying element 53 for preventing displacement of the focus varying element 53 from the housing 20 during its horizontal movement.

The contact element 51 consists of two rolling balls, the vertex of which is always in contact with the bottom of the cover plate and the bottom of which is always in contact with an upper surface of the focus varying element 53. This point-to-point contact significantly facilitates the control of dimensional precision. When the focus varying element 53 is driven to move along a horizontal direction, the bottom of each rolling ball 51, which is engaged with an upper surface of the focus varying element 53, is correspondingly moved along upper surfaces at different levels of the focus varying element 53 in a vertical direction. This vertical movement of the rolling balls 51 changes the distance between the upper surface of the housing 20 and the bottom of the cover plate, thereby achieving focus varying purposes. FIGS. 6 and 7 respectively illustrate that the rolling balls 51 are engaged with a first upper surface 531 at a higher level and a second upper surface 532 at a lower level of the focus varying element 53.

The retaining element 52 is in the form of a plate, and defines two receiving holes 520 for receiving the two rolling balls 51 therein and two positioning holes 521 for allowing extension of bolts therethrough to secure the retaining element 52 to the housing 20. An annular ring 522 is further disposed on the upper surface of the retaining element 2 around the periphery of each receiving hole 520, whereby displacement of the rolling ball 51 from the receiving hole 520 is prevented and stable focusing and scanning performance is thus ensured. It should be understandable that the rolling ball 51 may be replaced by other equivalents, such as a column, to perform the same function.

The supporting element 54 has two legs 540 extending downwardly from a lower surface thereof and an adjusting hole 541 defined therethrough. Each leg 540 is adapted to be inserted into a corresponding positioning hole 21 defined in the end portion of the housing 20. The adjusting hole 541 is vertically aligned with an internally threaded hole 22 defined in the end portion of the housing 20.

In the embodiment of the present invention, the focus fine adjusting element 55 is preferably in the form of a slotted screw, which can be rotated for allowing the contact element 51 to move upwards and downwards to a small extent. The vertical movement amount of the contact element 51 can be adjusted by controlling the rotation amount of the slotted screw 55, whereby the application of conventional pads of different thickness can be prevented in the present invention.

The screw 55 is rotatably received in the aligned threaded hole 22 of the housing 20 and the adjusting hole 541 of the supporting element 54. When the screw 55 is rotated for vertical movement, the distance between the upper surface of the supporting element 54 and the lower surface of the housing 20 is correspondingly changed. That is, when the screw 55 is rotated to move upwardly, the supporting element 54 is correspondingly moved upwardly, and thus the distance between the upper surface of the supporting element 54 and the lower surface of the housing 20 is correspondingly increased. Similarly, when the screw 55 is rotated to move downwardly, the supporting element 54 is correspondingly moved downwardly, and thus the distance between the upper surface of the supporting element 54 and the lower surface of the housing 20 is correspondingly decreased. Therefore, fine adjusting of the vertical position of the contact element 51 can be realized.

To facilitate understanding of the present invention, a further detailed explanation is provided below. As is clear from the above description, the movable components of the present focus adjusting device 50 include the focus varying element 53, the contact element 51 (i.e., the rolling balls 51), the supporting element 54 and the focus fine adjusting element 55 (i.e., the slotted screw 55). The fixed component of the present focus adjusting device 50 includes the retaining element 52 for receiving the rolling balls 51. The movable components of the present focus adjusting device 50 can be further classified into two types, i.e., active components and passive components. The passive components include the contact element 51 (i.e., the rolling balls 51) and the supporting element 54, and the active components include the focus fine adjusting element 55 (i.e., the slotted screw 55) and the focus varying element 53. It is understandable that, before leaving the factory, each image sensor has an overall vertical dimension from the lower surface of the housing 20 to the vertex of the rolling ball 51, which is the sum of the vertical dimensions of the components thereof. Ideally, this overall vertical dimension should correspond to the optimum focus dimension of the image sensor. However, due to the inevitable tolerances present in manufacturing and assembly, the overall vertical dimension of the image sensor may out of the range of the object dimension and the permissible tolerance. To solve this problem, the focus fine adjusting element or screw 55 is applied in the present invention, which is rotatable for controlling vertical movements of the supporting element 54, the focus varying element 53 and the contact element or rolling balls 51. If desired, when the focus fine adjusting action is implemented, a gel may be filled in the adjusting hole 22 of the housing 20 for fixing the adjusted position of the focus fine adjusting element or screw 55. When focus varying is desired, for example, when a negative is to be scanned, because the negative is separated from the upper surface of the cover plate by a negative carrier, the focus varying element 53 should be driven to move in the horizontal direction so that the rolling balls 51 are correspondingly moved along the upper surfaces of the focus varying element 53 in the vertical direction to a large extent. With a negative to be scanned, the rolling balls 51 should be guided into a depressed portion of the focus varying element 53. That is, the bottom of the rolling balls 51 should be guided to engage with the second upper surface 532 of the focus varying element 53. The descent of the rolling balls 51 causes decrease of the distance between the upper surface of the housing 20 and the lower surface of the cover plate, whereby the affection brought by the incorporation of the negative carrier is thus released. It should be understandable that, when focus varying is not desired, the focus varying element 53 can be omitted, whereby the bottom of the rolling balls 51 will directly contact with the upper surface of the supporting element 54 to achieve the focus fine adjusting purpose.

Figure 8:
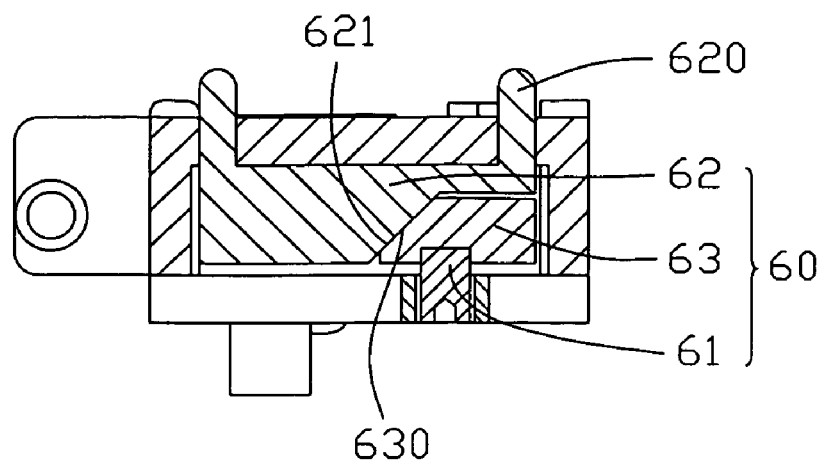
FIG. 8 is a cross-sectional view of a focus adjusting device in accordance with a second embodiment of the present invention.

FIG. 8 illustrates a focus adjusting device 60 for an image sensor 1 in accordance with a second embodiment of the present invention. The focus adjusting device 60 is mounted at each end of the housing 20 of the image sensor 1, and comprises an active element 61, a passive element 62 and an auxiliary element 63 between the active element 61 and the passive element 62. The active element 61 is a slotted screw, the bottom of which is slotted for manual rotation and a top portion of which is engaged with a bottom portion of the auxiliary element 63. The passive element 62 is a block and has two protrusions 620 upwardly projecting from an upper surface thereof for contacting with the lower surface of a scanner cover plate. An inclined surface 621 is provided on the passive element 62 connecting with a bottom surface of the passive element 62. The inclined surface 621 abuts against an inclined surface 630 on the auxiliary element 63. When the slotted screw 61 is rotated, the auxiliary element 63 is correspondingly moved upwards and downwards, and the passive element 62 is thus actuated to vertically move due to the engagement between the inclined surfaces 620 and 630. In this way, focus adjusting can be thus realized. Further, the engagement between the inclined surfaces 620 and 630 causes the passive element 62 to vertically move along an inner surface of the end portion of the housing 20, thereby avoiding uneven movement of the passive element 62.

Figure 9:
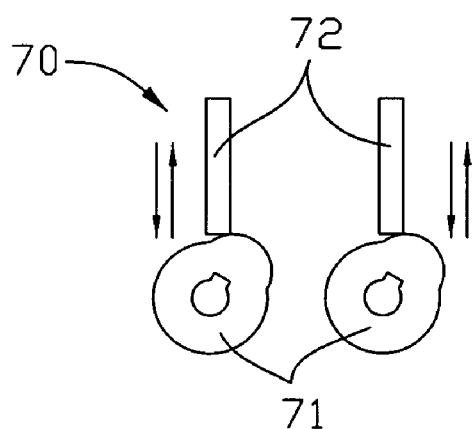
FIG. 9 is a schematic view of a focus adjusting device in accordance with a third embodiment of the present invention.

FIG. 9 illustrates a focus adjusting device 70 for an image sensor 1 in accordance with a third embodiment of the present invention. The focus adjusting device 70 includes an active element 71 and a passive element 72. The active element 71 is in the form of a pair of cams, and the passive element 72 is in the form of a pair of rods. The top of the rod 72 is adapted to directly contact with the lower surface of a scanner cover plate, and the bottom of the rod 72 is engaged with the cam 71. When the cam 71 is rotated, the bottom of the rod 72 is guided along the contour of the cam 71, whereby the rod 72 is moved upwards and downwards for focus adjusting.

Figure 10:
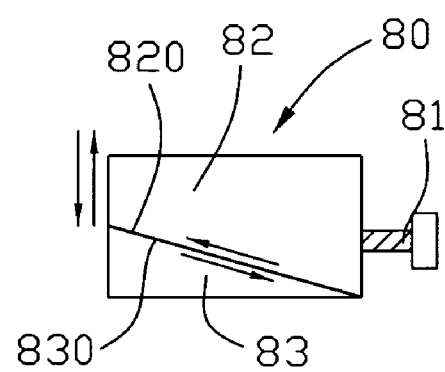
FIG. 10 is a schematic view of a focus adjusting device in accordance with a fourth embodiment of the present invention.

FIG. 10 illustrates a focus adjusting device 80 for an image sensor 1 in accordance with a fourth embodiment of the present invention. The focus adjusting device 80 includes an active element 81 in the form of a screw, a passive element 82 in the form of a slider, and an auxiliary element 83. The screw 81 is mounted in one side of the slider 82. The bottom surface 820 of the slider 82 is inclined to slidably engage with an inclined upper surface 830 of the auxiliary element 83. When the screw 81 is pushed or pulled, the slider 82 is guided to correspondingly move along the inclined upper surface 830 of the auxiliary element 83 in an upward or downward direction.

Figure 11:
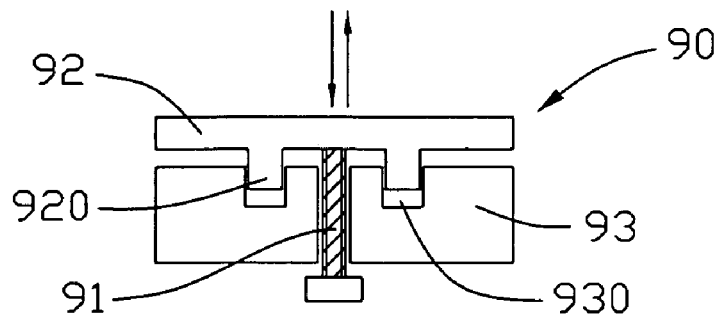
FIG. 11 is a schematic view of a focus adjusting device in accordance with a fifth embodiment of the present invention.

FIG. 11 illustrates a focus adjusting device 90 for an image sensor 1 in accordance with a fifth embodiment of the present invention. The passive element of the focus adjusting device 90 is a supporting plate 92, the upper surface of which is adapted to directly contact with the lower surface of a scanner cover plate. The supporting plate 92 is supported by an active element of the focus adjusting device 90 that is in the form of a screw 91 received in an auxiliary element 93. When the screw 91 is rotated, the supporting plate 92 is driven to vertically move. The supporting plate 92 further has two downwardly extending legs 920 movably received in corresponding slots 930 of the auxiliary element 93.

The function of the passive elements 62, 72, 82 and 92 in the respective second, third, fourth and fifth embodiments as disclosed above is to directly contact with the lower surface of the scanner cover plate. However, it should be understood that, they may also be the substitutes for the supporting element 54 in the first embodiment. In other words, the focus adjusting devices 60, 70, 80 and 90 in the respective second, third, fourth and fifth embodiments can be used alone as a focus fine adjusting device for the present image sensor 1 for performing a focus fine adjusting function. Alternatively, each of them may also be used together with a focus varying device as disclosed for performing both focus varying and focus fine adjusting functions. Each of the focus adjusting devices 60, 70, 80 and 90 may even act as an integrated device with both focus varying and focus fine adjusting functions.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An image sensor comprising:
    a sensing substrate with image sensing elements disposed thereon;
    a light source adapted for illuminating the object to be scanned;
    a lens for gathering the light reflected from the object to be scanned and focusing the reflected light on the image sensing elements on the sensing substrate;
    a housing for housing the sensing substrate, the light source and the lens; and
    a focus adjusting device disposed in the housing, the focus adjusting device comprising a focus adjusting element movable in a first direction relative to the housing, and a contact element for directly contacting with a lower surface of a scanner cover plate where the object to be scanned rests, the contact element being movable in the first direction when driven by the focus adjusting element; wherein
    when the contact element is driven to move in the first direction by the focus adjusting element, the distance between an upper surface of the housing and the lower surface of the scanner cover plate is correspondingly changed; and wherein
    the focus adjusting device further comprises a focus varying element disposed between the contact element and the focus adjusting element, the focus varying element directly engaging with the contact element in the first direction and being independently movable in a second direction perpendicular to the first direction for driving the contact element to also move in the first direction.

2. The image sensor as claimed in claim 1, wherein the focus varying element is elongated, and the contact element is engaged with one side of the focus varying element.

3. The image sensor as claimed in claim 2, wherein said one side of the focus varying element engaging with the contact element includes at least two surfaces at different levels in the first direction, whereby the contact element is guided by at least two surfaces of the focus varying element to move in the first direction.

4. The image sensor as claimed in claim 3, further comprising a supporting element disposed between the focus varying element and the focus adjusting element, the supporting element having one side engaging with the focus varying element and the opposite side engaging with the focus adjusting element.

5. The image sensor as claimed in claim 4, wherein the supporting element is movable in the first direction when driven by the focus adjusting element, the focus varying element is movable in the first direction when driven by the supporting element, and the contact element is movable in the first direction when driven by the focus varying element moving in the first direction.

6. The image sensor as claimed in claim 5, wherein the housing defines a positioning hole and an adjusting hole therein, and the supporting element has an adjusting hole aligned with the adjusting hole in the housing and a leg formed on said the opposite side thereof for being inserted into the positioning hole in the housing.

7. The image sensor as claimed in claim 6, wherein the focus adjusting element is a screw received in the adjusting holes of the housing and the supporting element, and the adjusting holes of the housing and the supporting element are internally threaded.

8. The image sensor as claimed in claim 1, wherein the focus adjusting device further comprises a retaining element for retaining the contact element therein, and the contact element retained in the retaining element is restricted to move only in the first direction.

9. The image sensor as claimed in claim 8, wherein the contact element is a rolling ball.

10. The image sensor as claimed in claim 9, wherein the retaining element is in the form of a plate, and comprises a receiving hole for retaining the rolling ball, a positioning hole for securing the retaining element to the housing by a bolt, and an annular ring disposed around the periphery of the receiving hole for preventing displacement of the rolling ball from the receiving hole.

11. The image sensor as claimed in claim 2, wherein the focus varying element has a bar at each end thereof for preventing displacement of the focus varying element from the housing when moving in the second direction.

12. The image sensor as claimed in claim 1, wherein the contact element is driven by the focus varying element to move in the first direction to a greater extent than the extent to which the contact element is driven by the focus adjusting element to move in the first direction.

13. A focus adjusting device for an image sensor used in an electrical equipment, comprising:
    a contact element for directly contacting with a surface of the electrical equipment; and
    a focus adjusting mechanism for driving the contact element to move in a vertical direction, the focus adjusting mechanism comprising, in order in the vertical direction, a focus varying element, a supporting element disposed in a housing of the image sensor and a focus adjusting element beneath the supporting element, wherein the focus varying element has one side engaging with the contact element in the vertical direction and is independently movable in a horizontal direction to drive the contact element to move in the vertical direction, and wherein the focus adjusting element is movable in the vertical direction and thus sequentially drives the supporting element, the focus varying element and the contact element to correspondingly move in the vertical direction.

14. The focus adjusting device as claimed in claim 13, wherein said one side of the focus varying element includes at least two surfaces at different levels in the vertical direction for engaging with the contact element, whereby the contact element is engaged and guided by the at least two surfaces of the focus varying element to correspondingly move in the vertical direction.

15. The focus adjusting device as claimed in claim 13, wherein the contact element is driven by the focus varying element to move in the vertical direction to a greater extent than the extent to which the contact element is driven by the focus adjusting element to move in the vertical direction.

* * * * *